Patented July 28, 1953

2,647,080

UNITED STATES PATENT OFFICE 2,647,080

LIGHT-STABILIZED PHOTOPOLYMERIZATION OF ACRYLIC ESTERS

Robert M. Joyce, Wilmington, Del., assignor to E. I. du Pont de Nemours and Company, Wilmington, Del., a corporation of Delaware No Drawing. Application June 30, 1950,
Serial No. 171,561

6 Claims. (Cl. 204—158)

This invention relates to polymeric materials and more particularly to an improved method for their preparation in the presence of light.

In the photopolymerization of olefinic compounds capable of undergoing addition polymerization, e. g., methyl methacrylate, a variety of initiators, e. g., acyloins and their ethers such as benzoin and benzoin methyl ether, have been found effective in increasing the rate of polymerization in the presence of light. However, the polymers obtained by this method are excessively discolored on further exposure to light, and consequently are not satisfactory for use in those applications requiring colorless polymers.

An object of the invention is to provide a process of photopolymerizing esters of arcylic acid and alpha-alkyl substituted acrylic acids with acyloins or their ethers to light-stable polymers. Another object is to provide a process for polymerizing the aforesaid esters with acyloins or the acyloin ethers as polymerization initiators, the polymer during and subsequent to polymerization being stabilized against discoloration by the presence of allyl glycidyl ether. Other objects and advantages of the invention will hereinafter appear.

It has now been found that the discoloration by light of halogen-free polymeric esters of acrylic or alpha-alkylacrylic acids polymerized in the presence of light and an acyloin or an acyloin ether as initiator is prevented without impairment of the polymerization rate by incorporating in the polymerization system a small quantity of allyl glycidyl ether. Moreover, the halogen-free polymeric esters of acrylic and alpha-alkylacrylic acids containing an acyloin or an acyloin ether are stabilized against light discoloration by the presence of allyl glycidyl ether.

The photoinitiators used in the process of this invention, i. e., the acyloins and their ethers, are organic compounds having a chain of two vicinal carbon atoms, each attached to but one oxygen atom, one of the vicinal carbon atoms being attached by two valences to one and the same oxygen atom or to the other vicinal carbon atom, no oxygen atom being attached to more than one of the vicinal carbon atoms, any valences of said oxygen atoms not satisfied by a vicinal carbon atom being satisfied by hydrogen or mono-valent hydrocarbon radicals, the remaining valences of the vicinal carbon atoms being satisfied by hydrogen or mono-valent hydrocarbon radicals.

The process of this invention is carried out by any of the conventional photopolymerization methods, such as bulk, emulsion, granular, and solution polymerization methods. In these methods the quantity of polymerization initiator can be varied over wide limits, amounts ranging from 0.01% to 1.0% or even up to 10%, based on the weight of the monomer being polymerized, are operable. Since the rate of polymerization is dependent on the amount of initiator present, it is desirable to use a quantity sufficient to produce a practical rate of polymerization. For this reason, amounts ranging from 0.04% to 0.2% are preferred. Exceedingly large proportions of these initiators are less desirable since they do not greatly increase the rate of polymerization, but do increase the amount of color developed in the polymer.

The proportions of allyl glycidyl ether necessary to inhibit discoloration of the esters of acrylic or alpha-alkylacrylic acids polymerized in the presence of the above-defined initiators can also vary over wide limits. Amounts ranging from 0.5% to 15% or more of the weight of the polymeric system are operable. The particular amount of allyl glycidyl ether required to inhibit color formation is dependent on the amount of the photoinitiator present. In general, the larger the amount of photoinitiator the larger is the quantity of allyl glycidyl ether required. Best results are obtained when an amount of allyl glycidyl ether ranging from 10 to 50 times the weight of the photoinitiator is employed.

The process of this invention is effective when the polymerization system is exposed to ultraviolet or visible light. Sources of light which are particularly useful include sunlight, mercury arcs, fluorescent light bulbs with special phosphors having maximum emission in the ultraviolet, and sunlamps of the type having both tungsten filaments and mercury arcs, which emit light of essentially all wave lengths down to 3000 Å.

The reaction vessels employed in carrying out the process of this invention can be either transparent to light or opaque. When transparent reactors are used an external source of light can be employed but opaque reactors require a light source inside the reactor. Reactors suitable for use on a small scale are conveniently made of chemically resistant glass of the borosilicate type, such as "Pyrex."

The invention is illustrated in further detail by the following examples in which the proportion of ingredients are expressed in parts by weight unless otherwise noted.

*Example 1.*—A "Pyrex" glass reaction tube is charged with 5.55 parts of freshly distilled monomeric methyl methacrylate containing 0.0278 part of benzoin and 0.5 part of allyl glycidyl ether. The reaction tube is then flushed out with nitrogen and sealed under vacuum. The reaction tube and its contents are exposed to light from two 15-watt fluorescent light bulbs having maximum emission of light at about 3600 Å. The methyl methacrylate is polymerized in about 3 hours to a clear colorless solid. This polymer shows no evidence of discoloration after exposure for 8 hours to the light from a sunlamp having a tungsten filament and a mercury arc and emitting light of essentially all wave lengths down to 3000 Å. Under the same conditions of exposure, a control polymer containing no allyl glycidyl ether is badly yellowed.

*Example 2.*—A "Pyrex" glass reaction vessel is charged with 100 parts of freshly distilled monomeric methyl methacrylate, 0.054 part of alpha-methylbenzoin, and 10.7 parts of allyl glycidyl ether, after which the reaction vessel is swept out with nitrogen and closed. The reactor and its contents are exposed to the sun for two weeks. After removal from the reaction vessel, the colorless polymethyl methacrylate is exposed to light from a sunlamp of the type described in Example 1 for 24 hours with no evidence of discoloration. A control sample polymerized in the same way, with the single exception that no allyl glycidyl ether is present, is yellow in color at the completion of polymerization and is still further discolored on exposure to the sunlamp.

*Example 3.*—A mixture of 100 parts of commercial unplasticized methyl methacrylate syrup (partially polymerized methyl methacrylate), 0.04 part of benzoin and 2 parts of allyl glycidyl ether is mixed until uniform and then poured in a layer about ⅛" thick on the surface of concentrated magnesium chloride brine having a specific gravity of 1.325 in a container made of polymerized ethylene. The polymerization cell is closed with a glass plate and placed under a bank of fluorescent lights of the type described in Example 1 until the methyl methacrylate is completely polymerized, from 3 to 5 hours being required. The resulting colorless sheet of methyl methacrylate polymer of about 0.1 in. thickness, is removed from the casting cell, washed with water, and heated in a circulating air oven for 30 minutes at 100° C. and for 30 minutes at 150° C. The resulting sheet of methyl methacrylate polymer is only very slightly yellowed after 500 hours exposure to a mercury vapor light; whereas a control sheet of methyl methacrylate polymerized in the same way, but in the absence of allyl glycidyl ether, turns to a deep yellow color when exposed to light under the same conditions.

*Example 4.*—A "Pyrex" glass reaction vessel is charged with 100 parts of monomeric methyl methacrylate, 0.054 part of benzoin ethyl ether and 10.7 parts of allyl glycidyl ether. The reaction vessel is swept out with nitrogen, closed and exposed to the sun for two weeks. The resulting solid polymethyl methacrylate is colorless, and it remains so after further exposure to a sunlamp for 24 hours. A control sample polymerized in the same way, but in the absence of allyl glycidyl ether, is yellow at the completion of polymerization and is still further discolored on exposure to the sunlamp.

The examples have illustrated the process of this invention by reference to the photopolymerization of methyl methacrylate; however, allyl glycidyl ether is also effective in inhibiting discoloration by light of polymeric esters of acrylic acid and other alpha-alkylacrylic acids polymerized in the presence of acyloins or acyloin ethers. For example, other specific esters of this type, which are polymerizable to colorless polymers by the process of the invention, include ethyl acrylate, n-propyl acrylate, isobutyl methacrylate, ethyl alpha-ethylacrylate, n-decyl acrylate, 3,5,5-trimethylhexyl methacrylate and dimethacrylates or diacrylates of diols, such as polyethylene glycol.

In addition to the specific photoinitiators mentioned in the examples, other compounds of the type defined above can be used in the process of this invention. An especially suitable sub-class of initiators coming under the generic definition is that of the acyloins, i. e., alpha-carbonyl alcohols of the formula

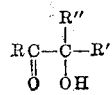

wherein R and R' are the same or different and are monovalent hydrocarbon radicals and R'' is hydrogen or a monovalent hydrocarbon radical. Specific examples of compounds of this type include benzoin, alpha-methylbenzoin, acetoin, butyroin, 3-hydroxy-4-methyl-2-pentanone, toluin, tertiary butylbenzoin, and p-tertiary butyltoluin.

Another sub-class of photoinitiators included by the above generic definition is that of the ethers of the acyloins, i. e., compounds having the formula

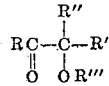

wherein R, R' and R''' are monovalent hydrocarbon radicals and R'' is hydrogen or a monovalent hydrocarbon radical. Specific examples of photoinitiators of this type include benzoin methyl ether, benzoin ethyl ether, benzoin propyl ether, pivaloin ethyl ether, and anisoin methyl ether.

Allyl glycidyl ether, in the amounts preferably employed in this process, has no adverse effect on the rate of polymerization of acrylates or alpha-alkylacrylates in the presence of acyloins or acyloin ethers as initiators. For example, in a series of photopolymerizations of methyl methacrylate in the presence of 0.2% benzoin and containing respectively 0, 1, 2, 3, 4, 5, 6, 7, 8 and 9% allyl glycidyl ether, the course of the polymerizations was followed by means of the refractive indices of the polymerization mixture, and it was observed that in all of these systems, polymerization proceeded at the same rate.

The effect of allyl glycidyl ether in inhibiting discoloration of acrylate or alpha-alkylacrylate esters photopolymerized in the presence of acyloins or acyloin ethers is specific to this particular compound and is not a common property of all allyl or epoxy compounds. This beneficial effect of allyl glycidyl ether is quite unexpected. Other epoxy and other allyl compounds are ineffective in inhibiting discoloration of acrylates polymerized in the presence of acyloins. For example, the following specific compounds have been found ineffective in preventing discoloration by light of methyl methacrylate polymerized in the presence of benzoin: phenoxy-propene oxide, naphthoxypropene oxide, allyl epoxyisovalerate, allyl cyanide, allylamine, allyl adipate, allylidene diacetate, acrolein, allyl acetate, allyl bromide and allyl chloroacetate.

The process of this invention provides a substantial advance in the art of photopolymerization of esters of acrylic and alpha-alkylacrylic acids since the resulting polymers are stabilized with respect to discoloration on further exposure to light, due to the presence in the polymerization system of allyl glycidyl ether, without the good rate of polymerization provided by the acyloin or acyloin ether as initiator being impaired by the presence of the color stablizing agent. Furthermore, the degree of stability provided by allyl glycidyl ether is such that the resulting polymers are highly satisfactory for use in those applications where the polymeric material must be exposed out doors or to other strong light sources. Acrylic and alpha-alkylacrylic esters photopolymerized in the presence of initiators such as benzoin have not hitherto been suitable for such uses because of their excessive discloroation by light.

I claim:

1. A composition containing a light-stable polymeric halogen-free ester of an acid of the group consisting of acrylic acid and alpha-alkylacrylic acids, allyl glycidyl ether and a photopolymerization initiator of the group consisting of acyloins and acyloin ethers.

2. The product of claim 1 which contains from 0.01% to 10%, by weight of the ester, of the polymerization initiator and from 0.5% to 15% of the allyl glycidyl ether based on the weight of the polymeric system.

3. A process for the preparation of a light-stable polymer which comprises photopolymerizing a halogen-free ester of an acid from the group consisting of acrylic acid and alpha-alkylacrylic acids with a polymerization initiator of the group consisting of acyloins and acyloin ethers with allyl glycidyl ether as the light-stabilizing agent.

4. The process of claim 3 conducted with 0.04% to 0.2% of the polymerization initiator based on the weight of the monomeric ester and an amount of allyl glycidyl ether equal to 10 to 50 times the weight of the polymerization initiator.

5. A composition containing a halogen-free ester of an acid of the group consisting of acrylic acid and alpha-alkylacrylic acids, allyl glycidyl ether and a photopolymerization initiator of the group consisting of acyloins and acyloin ethers, the ester of said composition being polymerizable to a light-stable polymer.

6. A comopsition of matter comprising polymeric methyl methacrylate, from 0.01% to 10% by weight of the ester of benzoin and from 0.5% to 15% of allyl glycidyl ether based on the weight of the polymeric system.

ROBERT M. JOYCE.

References Cited in the file of this patent

UNITED STATES PATENTS

| Number | Name | Date |
|---|---|---|
| 1,728,656 | Brandley | Sept. 17, 1929 |
| 2,367,661 | Agre | Jan. 23, 1945 |
| 2,448,828 | Renfrew | Sept. 7, 1948 |